Aug. 20, 1935.  C. J. CROWLEY  2,011,562
VALVE FOR INFLATABLE BALLS AND THE LIKE
Filed Aug. 13, 1932
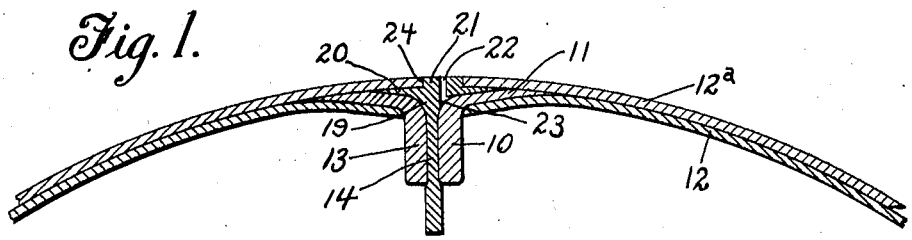
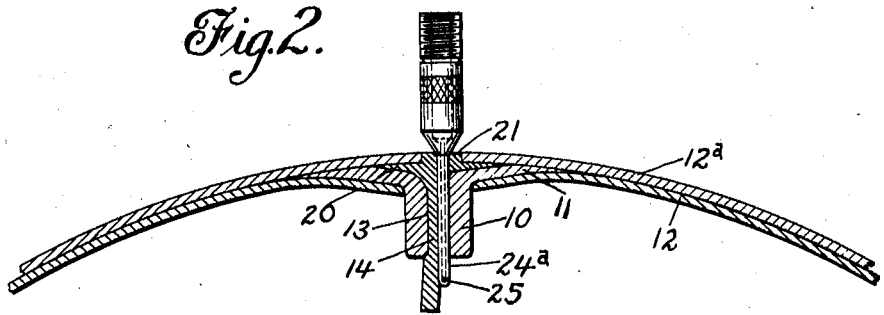
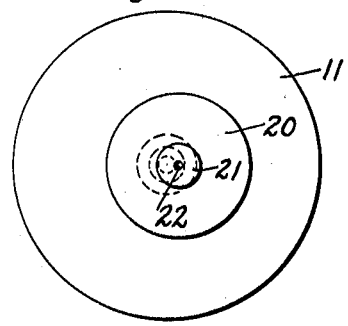
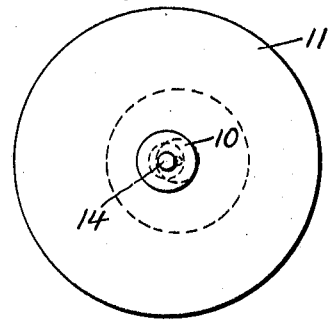
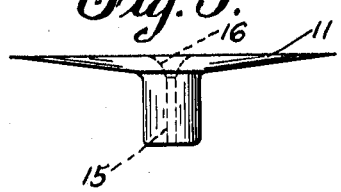
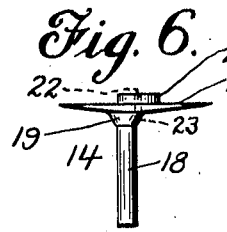
Inventor
Cornelius J. Crowley
Rodwell & Bartholow
By
Attorneys Patented Aug. 20, 1935

2,011,562

UNITED STATES PATENT OFFICE 2,011,562

VALVE FOR INFLATABLE BALLS AND THE LIKE

Cornelius J. Crowley, New Haven, Conn., assignor to The Seamless Rubber Company, Inc., New Haven, Conn., a corporation of Massachusetts Application August 13, 1932, Serial No. 628,676

30 Claims. (Cl. 273—65)

This invention relates to inflating valves for such articles as football bladders, playballs and the like, and it has particular reference to a valve all of whose parts are constructed of rubber, although this is not requisite in all aspects of my invention.

In the production of football bladders, for example, difficulty has been encountered as a result of the fact that the valves provided on the bladders would not hold the air for a sufficient length of time.

One of the objects of my invention is to provide a valve by means of which it is possible to provide against any substantial leakage of air from the ball during a longer period than has been possible heretofore.

Another object is to provide a valve which is very simple and inexpensive and which can be very readily applied to the inflatable article in the process of manufacture, and which permits the inflation of the article in a convenient and expeditious manner.

To these and other ends the invention consists in the novel features and combinations of parts to be hereinafter described and claimed.

In the accompanying drawing:

Fig. 1 is a sectional view of a portion of a football provided with my new valve structure, showing the position of the parts when the article is in use;

Fig. 2 is a similar view illustrating the manner of inflating the article by the use of an inflating needle;

Fig. 3 is a detail top plan view of the valve removed from the bladder;

Fig. 4 is a bottom view of the valve shown in Fig. 3;

Fig. 5 is a detail side elevation of the outer valve member, and

Fig. 6 is a detail side elevation of the inner valve member.

In the practice of my invention I prefer to make all parts of the valve of rubber, although this is not essential in all cases, and preferably the valve comprises an outer tubular part of rubber having a flange by means of which it is attached to the bladder, and an inner solid part of rubber adapted to be inserted into a bore or passage in the outer part. I find it convenient to make use of an inflating needle in passing air into the bladder or other hollow article for inflation; and the structure of the valve is such that the needle can be caused to pass readily from the exterior through the wall of the hollow article so that the inner end of the needle containing the air-hole will be inside the article to conduct air into its interior. The structure is also such that after withdrawal of the inflating needle, the passage through which it has been introduced will be closed very tightly against outward leakage of air.

In the particular form shown in the drawing, the outer member of the valve structure is constituted by a tubular member of rubber 10, having a flange 11 at one end by means of which it is adhesively applied to the bladder wall 12, preferably at the outer surface of the bladder wall. The tubular member 10 preferably has a relatively thick side wall 13 to which the flange 11 is integrally joined. Within the tubular member 10 is another valve part, likewise preferably constructed of rubber, extending through the longitudinal passage in the tubular member 10. This inner member is indicated at 14 and it preferably consists of a solid rubber plug relatively long and narrow, tightly held in the passage through the tubular valve member.

In practice, the outer valve member may be constructed in the form shown in detail in Fig. 5, from which it will be noted that a longitudinal passage goes through the valve member from end to end. The main part 15 of this passage is preferably round in cross-section and provides a narrow bore or passageway, inasmuch as it has a relatively small diameter. At its upper end the passage has a flared mouth 16 and this flared mouth is located in the flanged portion 11 of the tubular member. The inner valve member which I have selected to illustrate is shown in detail in Fig. 6, and it will be observed that it has a narrow elongated cylindrical elastic plug element 18, adapted to be passed through the passage 15, and that above the plug element 18 is a somewhat enlarged flaring portion 19, adapted to be accommodated in the flared recess 16 of flange 11. Above portion 19 and integral therewith is a thin tapered flange 20 adapted to lie against the upper surface of flange 11. Projecting upwardly from the upper surface of flange 20 is a locating member 21 preferably in the shape of a small disk. This disk-like locating member is eccentrically disposed with reference to the plug element or shank 18, although said locating member is in this instance concentric with flange 20, and a small hole or perforation 22 through the locating member leads to an opening 23 (Fig. 1) that is located at the side of the enlargement 19 and has its lower end adjacent the periphery of part 18. The locating member extends into a correspondingly shaped opening 24 in the cover 12ᵃ of the ball, said cover being of leather or other suitable material.

When the parts are assembled, the plug element 18 extends through and is compressed in the passageway of the outer valve member, the lower end of member 18 projecting downwardly beyond member 10, as shown in Fig. 1. Part 19 is disposed in recess 16 and flange 20 rests against the upper surface of flange 11. The inner face of flange 11 is applied to the outer face of bladder wall 12 over a certain area, the upper surface of flange 20 will contact with the inner surface of the cover wall over a certain area, and the locating member 21 fits within the opening 24 in the cover in such a manner that the outer face of the locating member 21 is flush or approximately flush with the outer surface of the cover. The locating member positions the valve structure with relation to the cover or case and serves to guide the inflating needle to a predetermined point in the periphery of the inner valve member.

In the operation of inflating the bladder or other article, a needle such as shown in Fig. 2 is employed, said needle having a narrow tubular elongated shank 24a with an opening 25 adjacent the end thereof. The shank 24a is introduced into the hole 22 and pushed down into the ball into the position shown in Fig. 2, in which operation the needle shank passes between elastic plug 18 and tubular wall 13, so as to separate them at one side of the passageway and permit the end of the needle to pass beyond the end of valve member 10 to the inflating position. When the parts are in the position shown in Fig. 1, plug element 18 is under considerable compression as normally its cross-section is considerably larger than that of passageway 15. On the other hand, the wall of the tubular member is expanded laterally and presses on the plug in a lateral direction. The plug 18, therefore, exerts a strong outwardly and laterally acting force to hold the valve structure closed, and the tubular outer part exerts a strong inwardly and laterally directed force which assists in holding the valve closed. Thus, when the needle shank is withdrawn from the inflating position shown in Fig. 2, the relatively long passage through which it has been introduced is immediately closed and the article is sealed in a most effective manner against leakage of the air. Furthermore, it will be observed that the air pressure within the ball assists in keeping the valve in a closed position, inasmuch as this air pressure acts on the tubular wall 13 in a manner to compress the same upon the elongated plug member. Furthermore, the tight sealing of the valve against leakage is in part due to the fact that when the plug is inserted through its passage it is stretched lengthwise so that its respective enlarged end portions are under some stress in an axial direction relatively to the valve and are urged by the inherent resiliency of the plug member in opposite directions against the ends of the outer part of the valve structure. As shown in Fig. 6, the inner end of the plug is a plain end of the same normal diameter as the body of the plug, but when the valve is in assembled position the inner end of the plug, which extends into the interior of the hollow article, is relatively enlarged. The air pressure on this enlarged end in an outward axial direction is, of course, an additional factor in sealing the valve against leakage.

It will be seen that in the particular form shown, an elastic plug of considerable length fills and makes lateral closing contact over a considerable area with an air passage of considerable length in an elastic outer member, but that there is provided a readily accessible needle passage between the outer face of the plug and the inner face of the outer part. It will be seen that the flange 20, or its equivalent, on the inner member or plug prevents relative displacement thereof with respect to the outer member. The valve structure is very effective in practice and it can be very readily and conveniently assembled with the other parts in the process of manufacturing the ball or like article.

Various changes can be made in the details of the structure without departing from the scope of my invention as defined in the claims. I have considered a single embodiment sufficiently illustrative of the principles involved in my invention and have not attempted to illustrate or describe the many modifications which may be made without varying from the principles of the invention or sacrificing its advantages.

What I claim is:

1. A valve for inflatable articles comprising an outer member having a passageway through the same, said passageway having an elastic wall, an inner member in the form of an elongated plug filling the passageway of said outer member, a flange on the outer member for attaching it to the wall of the hollow article, a flange on the inner member lying against the flange of the outer member, and a projection on the flange of the inner member.

2. A valve for inflatable articles comprising an outer member having a passageway through the same, said passageway having an elastic wall, an inner member in the form of an elongated plug filling the passageway of said outer member, a flange on the outer member for attaching it to the wall of the hollow article, a flange on the inner member lying against the flange of the outer member, and a projection on the flange of the inner member located eccentrically with respect to said first-named flange and having a hole for an inflating needle.

3. A valve for inflatable articles comprising a tubular elastic outer member having a passageway therethrough, an elongated elastic plug filling said passageway, and a flange on the outer end of the plug, there being a small needle opening through said flange, substantially in line with lateral contacting surfaces of the plug and tubular member.

4. In an inflatable ball, an outer valve member having a passage therethrough, an inner valve member inserted into and filling said passage to close it against the escape of air, at least one of said members being elastic, a bladder carrying the outer member, a cover having an inflating aperture therein, and projecting means on the inner valve member extending into said inflating aperture for locating the valve relatively to the cover and having a perforation for guiding the end of an inflating needle into position to separate the valve members.

5. In an inflatable ball, a cover having an inflating aperture, a bladder within the cover, an inwardly extending tubular valve member carried by the bladder, an inner elastic plug inserted into said tubular valve member to close it against the escape of air, and a projection on the end of the inner plug fitting in the inflating aperture of the cover to locate the valve and bladder relatively to the cover.

6. In an inflatable ball, a cover having an inflating aperture, a bladder within the cover, a tubular valve member carried by the bladder having a passage leading through the same, an inner elastic plug in said passage to close the same, and a flange on the end of said plug held against the inside of the cover around the inflating opening, said flange having an opening through it in line with the joint between the plug and tubular member.

7. In an inflatable ball, a cover, a bladder within the cover, a tubular elastic outer valve member carried by the bladder, a solid elastic inner valve member filling the longitudinal passageway through the outer member, and an elastic flange on the inner elastic valve member at one end thereof held against the inner surface of the cover.

8. In an inflatable ball, a cover having an inflating aperture, a bladder, a tubular elastic outer valve member carried by the bladder and extending thereinto, an inner rubber valve plug located in the passageway through the outer valve member, and means for locating the valve structure relatively to the inflating aperture, said last named means being constructed substantially entirely of rubber, and including a member formed integrally with the elastic inner plug of the valve at the end of said plug and projecting into said inflating aperture.

9. In an inflatable ball, a cover having an inflating aperture, a bladder, a tubular elastic outer valve member carried by the bladder and extending thereinto, an inner rubber valve plug located in the passageway through the outer valve member, and means for locating the valve structure relatively to the inflating aperture, said last last named means being constructed substantially entirely of rubber, and including a member formed integrally with the elastic inner plug of the valve at the end of said plug and projecting into said inflating aperture, and a flange integral with the plug adapted to contact the inner face of the cover around the inflating aperture.

10. In an inflatable ball, a bladder, a valve carried thereby having a rubber outer member having a passage communicating with the interior of the bladder and a rubber filling plug within said passage, a cover having an inflating aperture, and means integral with the rubber filing plug for locating the valve structure relatively to said inflating aperture.

11. A football or like bladder having an interiorly projecting tubular elastic member, an elongated rubber plug filling the passage through said tubular member and projecting out of said passage at both ends, said plug being under tension in said passageway, and perforated means carried by the plug outside of the passageway for guiding the end of an inflating needle into a position to part the plug from the outer tubular member at a point on the periphery of the plug.

12. In a valve for inflatable articles, an elastic outer member having a longitudinal passageway extending therethrough, an inner member of elastic material having a portion extending through said passageway and under tension therein, said inner member completely filling said longitudinal passageway throughout the length of the latter, a cover member having an aperture therein, means on said inner member for engaging said aperture so as to locate the valve with respect to the cover member, and means on the inner member for guiding an inflating needle to a point on the periphery of the inner member.

13. In a valve for inflatable articles, an elastic closing plug having a flange adjacent one end, said plug being provided with a perforation leading through the flange from the outer face thereof to a point adjacent the side of the plug.

14. In a valve for inflatable articles, an elastic closing plug having a lateral flange adjacent one end, and a projection extending from the outer face of the flange, said projection having a passage leading through it to a point on the periphery of the plug body beneath the flange.

15. In an inflatable ball, a bladder, a valve carried thereby having a tubular elastic outer member provided with a longitudinal passageway communicating with the interior of the bladder, and an elastic inner plug completely filling said passageway from end to end substantially throughout the length thereof, a cover, and means including a flange integral with the plug to underlie the inner surface of the cover.

16. A valve for inflatable articles having an outer valve member and a long narrow highly elastic obturating plug therefor under tension therein, said plug having at one end an enlargement overlying the outer member, the other end of said plug being a plain end of the same normal diameter as the body of the plug, said plug being of such length that said plain end extends out of and beyond the outer valve member.

17. A valve for inflatable articles comprising an elastic outer member having an elongated passageway extending therethrough and communicating with the interior of the article, and a longitudinal inner member having an elastic body portion normally of greater diameter than said passageway and of substantially greater length than diameter located in said passageway and closing the same against the flow of air, said inner member being of greater length than said passageway and the portion of said inner member within said passageway completely filling the same and being under tension therein.

18. A valve structure for an inflatable ball comprising an outer member having a passage therethrough, an inner member inserted into and filling said passage to close it against the escape of air, at least one of said members being elastic, said inner member at one end extending beyond said outer member, a bladder, a flange on the outer valve member attached to the bladder, a cover, and means on the extended end of the inner valve member for locating the valve relatively to the cover and for guiding the end of an inflating needle into position to separate the valve members.

19. In a valve for inflatable articles, an elastic tubular outer member having a longitudinal passageway, and an inner member having an elastic imperforate narrow elongated body normally of greater diameter than said passageway extending longitudinally through said passageway and under compression by the wall of the outer member for closing the passageway against the flow of air substantially throughout the length of the passageway but partially separable from said wall by an inflating needle inserted through said passageway longitudinally of said body.

20. In a valve for inflatable articles, an elastic tubular outer member having a longitudinal passageway, and a longitudinal inner member having an elastic imperforate body normally of greater diameter than said passageway located in said passageway and under compression by the wall of the outer member substantially throughout its length for sealing the passageway against the flow of air, said inner member extending at one end beyond the outer member, and means associated with the extended end of the inner member through which an inflating needle is passed for guiding said needle longitudinally of said passageway to a point on the periphery of said inner member.

21. In a valve for inflatable articles, an elastic outer member having a longitudinal passageway, an elastic inner member in said passageway to close it against the flow of air, the inner member at one end extending beyond the outer member, and there being a needle-guiding perforation in the extended end of the inner member eccentric to said member.

22. A valve for inflatable articles comprising an elastic outer member having a longitudinal passageway communicating with the interior of the article, a long narrow elastic inner member within and extending longitudinally of said passageway and under compression in said passageway to seal the same by lateral contact over the passageway wall surface, said inner member being longer than said passageway and extending out of the same at both ends and one end portion of said inner member being perforated to present a guide for an inflating needle.

23. A valve for inflatable articles comprising a tubular elastic outer member having a longitudinal bore, a solid elongated elastic plug completely filling said bore, and a flange on one end of said plug outside of said bore, said flange having a receiving opening for an inflating needle, said opening being positioned to permit the needle to pass between the plug and outer member peripherally.

24. A valve for inflatable articles having an outer valve member and a long narrow highly elastic obturating plug therefor under tension therein, said plug having a perforated flange on one end thereof and the other end of said plug being a plain end of the same normal diameter as the body of the plug, said plug being of such length that said plain end extends out of and beyond said outer valve member.

25. A valve for an inflatable ball or similar article comprising an elastic tubular outer member presenting a longitudinal passage, and an elastic inner member having the portion intermediate its ends normally of greater diameter than said passage seated in said passage, said inner member having both ends extending longitudinally beyond said outer member and said intermediate portion being under compression by the lateral wall of said outer member so as to form a seal extending substantially over the lateral exterior area of said intermediate portion, the meeting surfaces of said intermediate portion and said outer member respectively being adapted for separation by an inflating needle introduced longitudinally of said inner member.

26. An elastic inflatable article having a wall structure provided with an inwardly extending passageway leading from the exterior to the interior, the wall of said passageway being elastic, a solid elastic plug or inner member having a body of considerable length normally greater in diameter than said passageway seated in said passageway so as to fill and seal the same and under compression in said passageway by the wall thereof, the laterally contacting surfaces of said outer member and inner member body being adapted for separation along a longitudinal line by an inflating needle, the inner end of said body being a plain end of the same normal diameter as said body and said plain end extending into the interior of the article.

27. A valve for inflatable articles comprising an outer member having a narrow passageway extending through the same in an axial direction, a narrow elongated elastic plug of greater length than said passageway seated therein and forming a seal along the side of the plug and extending out of the passageway at both ends, and means formed on the plug through which an inflating needle is passed for guiding said inflating needle into a position alongside the plug to separate the plug laterally from the outer member.

28. A valve for inflatable articles comprising an outer member having a narrow passageway extending through the same in an axial direction, a narrow elongated elastic plug of greater length than said passageway seated therein and forming a seal along the side of the plug and extending out of the passageway at both ends, and means including a guide hole on the plug for guiding an inflating needle into a position alongside the plug so as partially to separate the plug from the lateral contacting surface of the outer member.

29. A valve for inflatable articles comprising an elastic outer member having a narrow restricted passageway extending through the same in an axial direction and adapted to be traversed by an inflating needle, a narrow elongated elastic plug longitudinally disposed in said passageway and seated in said passageway, the walls of said passageway pressing against said plug throughout the length of said passageway and sealing the same along the side of the plug except when said needle is passed through said pasageway, said plug being under lateral compression in said passageway and extending at one end into the interior of the article, said plug having an integral flange at its opposite end overlying said elastic outer member.

30. An elastic inflatable article having a wall structure provided with a narrow restricted inwardly extending passageway leading from the exterior to the interior and adapted to be traversed by an inflating needle, the wall of said pasageway being elastic and relatively thick, a narrow longitudinal solid elastic plug or inner member having a body normally greater in diameter than said passageway seated in said passageway so as to fill and seal the same and under lateral compression in said passageway by the wall of the latter, the inner end of said body extending into the interior of the article.

CORNELIUS J. CROWLEY.